Sept. 25, 1962 R. L. ENSINGER 3,055,685
HYDRAULIC COUPLING HAVING AN INTERNAL COUPLING SLEEVE
Filed Oct. 22, 1959
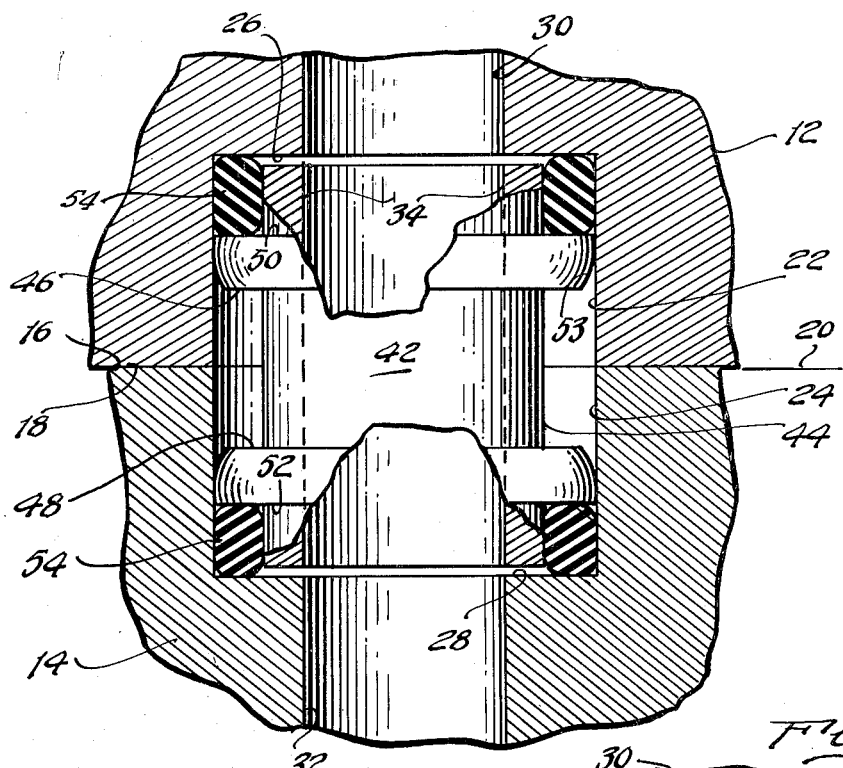
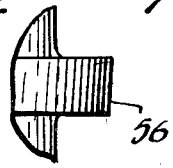
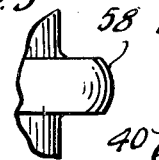
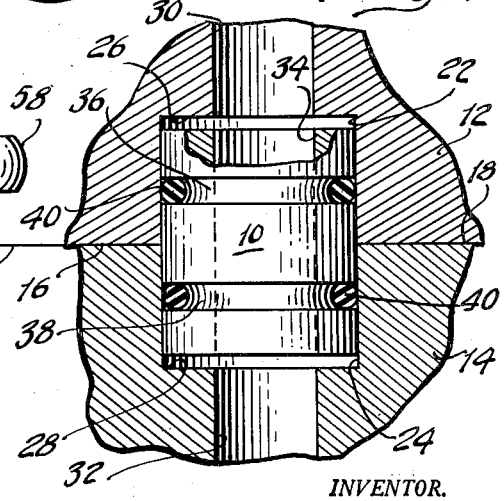
INVENTOR.
RAYMOND L. ENSINGER
BY
Whittemore Hulbert & Belknap
ATTORNEYS.

United States Patent Office 3,055,685
Patented Sept. 25, 1962

3,055,685
HYDRAULIC COUPLING HAVING AN INTERNAL COUPLING SLEEVE
Raymond L. Ensinger, Detroit, Mich., assignor to Holley Carburetor Company, Van Dyke, Mich., a corporation of Michigan
Filed Oct. 22, 1959, Ser. No. 848,056
1 Claim. (Cl. 285—347)

This invention relates to fluid systems for use in automobiles, aircraft, machine tools or the like.

More particularly, this invention relates to hydraulic systems wherein a hydraulic coupling or similar means is provided to connect conduits transmitting hydraulic fluid from one body portion to another, specifically where the conduits are located in mating body portions.

It is very important in fluid systems that the various conduits and couplings be absolutely clean, free from scale and from all kinds of foreign matter. In addition, it is necessary that the couplings not only join the conduits but also prevent leakage around the connected end of the conduits. This last requirement is particularly important in high pressure installations where the pressure fluid has a tendency to separate the coupling and parts thereof and leak fluid. Such a situation is undesirable in many applications because of safety requirements and excessive maintenance problems.

Couplings have been utilized in the past which meet various standards for conveying liquid under pressure in a hydraulic system without leakage. However, such hydraulic couplings have been expensive to manufacture since very close tolerances and squareness had to be maintained.

It is therefore an object of this invention to provide an improved hydraulic coupling for insertion between hydraulic conduits located in mating body portions.

Another object of this invention is to provide an improved hydraulic coupling for insertion between conduits located in body portions adjacent to each other so that the tolerance requirements are not as restrictive and controlling as heretofore.

Still another object of the invention is to provide a pair of body portions having smooth outer surfaces which abut each other, a fluid passage in each element terminating in an enlarged bore at the outer surfaces, a fluid coupling in the bores for joining the conduits, said coupling having a hollow sleeve with a pair of flanges on the outer periphery thereof, said flanges being inwardly spaced from the ends of the sleeve to define with the bore a pair of chambers in which is inserted seal means for preventing leakage from the conduits across the surfaces of engagement of the flanges with the sides of the bores.

A further object of the invention is to provide a hydraulic coupling which may be utilized in a fluid system which does not require excessive maintenance and where compactness of construction, reliability in operation, minimum of wear, ready accessibility, simplicity of construction, and which may be economically produced are essential.

These and other objects will become more apparent as the description proceeds especially in conjunction with the accompanying drawings, wherein:

FIG. 1 is a view of the improved hydraulic coupling shown in an inserted position between a pair of conduits in two matching body portions;

FIG. 2 is a partial view of a modification of the flange shown in FIG. 1;

FIG. 3 is a partial view of another modification of the flange shown in FIG. 1;

FIG. 4 is a view similar to the one shown in FIG. 1 wherein the prior art construction of a hydraulic coupling is shown in an inserted position between a pair of conduits in two abutting body portions.

It has been the accepted practice to form a sleeve-like hydraulic coupling 10 as is illustrated in FIG. 4. The coupling 10 is located between two body portions 12 and 14 having mating surfaces 16 and 18 respectively which abut each other at what will be referred to as the mating line 20. The body portions 12 and 14 have bores 22 and 24 respectively which extend inwardly from the mating line 20. The counterbores 22 and 24 have end surfaces 26 and 28 respectively. The counterbores 22 and 24 are coaxially arranged to provide an internal cavity or pocket in the body portions. A pair of hydraulic conduits 30 and 32, one in each body portion, terminate at end surfaces 26 and 28.

The hydraulic coupling 10 is inserted in the cavity composed of the counterbores 22 and 24 and has a hollow interior passage 34 which joins conduits 30 and 32 to provide a longitudinally extending passage from one body portion to the other.

The coupling or hollow sleeve 10 is of uniform diameter with the exception of a pair of circumferential grooves 36 and 38 which are equally spaced on opposite sides of the mating line 20 when in an inserted position. O-rings or seal means 40 are located in the cylindrical grooves 36 and 38 around the reduced portion of the sleeve 10 to provide an effective fluid seal at that point and thereby prevent fluid leakage across the body surfaces 16 and 18.

One of the disadvantages of this type of construction is that the counterbores 22 and 24 formed in the body portions 12 and 14 respectively are held to a diameter of about .002" to .006", larger than that of the coupling 10. The amount of clearance between the coupling 10 and the bores depends on the fluid pressure developed in the conduits. It should be noted that the center portion of the hydraulic coupling covers the mating line 20 of the body portions. As a result, plus the relatively close tolerances on the diameters of the counterbores and coupling 10, it is essential to hold the alignment and location of the counterbores 22 and 24 to very critical dimensions.

It is obvious when referring to FIG. 4 that the squareness of the counterbores 22 and 24 and the mating surfaces 16 and 18 is also a critical factor which had to be considered in designing a proper and effective fluid connector. Such a construction would not permit any substantial misalignment, tilting or cocking of the counterbores. In practice, location of the counterbores 22 and 24 is held to a total tolerance of .001".

In order to overcome the requirement of critical counterbores location, the invention provides for an improved hydraulic coupling 42 as illustrated in FIG. 1. Numerical designations used previously will be used where corresponding parts are provided. The hydraulic coupling 42 consists of a cylindrical sleeve 44 having a hollow passage 34 therethrough as does the prior art construction. However, it should be observed that the cylindrical sleeve 44 has a substantially smaller diameter than the counterbores 22 and 24 as contrasted to the prior art construction. A pair of flanges 46 and 48 are located on the outer periphery of the sleeve 44 to provide shoulders 50 and 52 which defines annular chambers with the ends of the bores 26 and 28 respectively and the sides thereof. Each flange has a radiused contoured side portion 53 as is shown in FIG. 1 so that a slight clearance is provided between the contoured surface 53 and the bore.

Although FIG. 1 shows a flange having a radiused type of contact surface 53, it should be apparent that other modifications of the contour of the flange may be utilized. FIG. 2 shows a cylindrical surface 56 while FIG. 3 shows another modification having a spherical or crowned surface of engagement 58. The ideal situation would be to utilize the spherical surface of engagement having its radius of curvature lying on the center line of the bore like a spherical ball in a cylindrical tube. However, the other designs work successfully.

A fluid seal or O-ring 54 is inserted in the chambers around the cylindrical sleeve 44. The O-rings 54 are retained in the chambers by the shoulders 50 and 52. The O-ring 54 may be made from neoprene, rubber or other suitable flexible material. The O-ring 54 is of such a size as to deform when in an assembled position and under pressure and thereby provides fluid tight surfaces between the outer periphery of the O-ring and the bore to prevent leakage across the surface of engagement between the contoured side portion 53 and the bore.

With the improved coupling shown in FIG. 1, it is required to hold the diametric dimensions of the flanges 46 and 48 and the counterbores 22 and 24. However, the location and squareness of the counterbores 22 and 24 is not as critical as before. As an example, it has been found that misalignment between the counterbores 22 and 24 in the amount of approximately .008" is permissive and acceptable. Such misalignment is possible due to the ability of the hydraulic coupling 42 to tilt or to misalign itself within the misaligned counterbores and still be effective to prevent fluid leakages. The sleeve 44 does not engage the cylindrical bores at the mating surfaces as done in the prior art. Only part of the contour surface 53 of the flange engages the bore. The coupling 42 is therefore permitted to tilt in the bores. As a result thereof, the flange contour surfaces 53 are rotated slightly but still provide only slight clearances with the bores.

By not requiring as stringent requirements for the squareness of the counterbores and the mating surfaces, as heretofore, has resulted in substantial economic savings and in addition thereto has overcome many of the manufacturing and assembling inconveniences previously encountered.

The drawings and the foregoing specification constitute a description of the improved hydraulic coupling in such full, clear, concise and exact terms as to enable any person skilled in the art to practice the invention, the scope of which is indicated by the appended claim.

What I claim as my invention is:

A fluid power transmission line assembly comprising a pair of tubular elements having smooth end surfaces which are disposed substantially in an abutting surface-to-surface arrangement, said elements including interconnected substantially axially aligned fluid passages which are provided at their adjacent ends with cylindrical counterbores of substantially the same diameter, said counterbores defining a pocket, a coupling sleeve of circular cross-section throughout its extent disposed in said pocket and having a connecting passage therethrough which is substantially axially aligned with said fluid passages, axially spaced annular abutments at opposite ends of said pocket, the axial distance between said abutments being slightly greater than the length of said sleeve to provide clearances which define leakage paths between the ends of said sleeve and said abutments, said sleeve including a pair of integral radially extending and axially spaced flanges which are located inwardly from the ends of said sleeve, the end portions of said sleeve between the ends thereof and said flanges being of cylindrical shape, said flanges having inner and outer faces and including curved outer peripheral surfaces which are adjacent the cylindrical wall of said pocket, the major diameter of each of said flanges being smaller than the diameter of said pocket to provide slight clearance between each of said peripheral surfaces and said pocket, said inner faces confronting said abutments, an intermediate cylindrical portion having a diameter less than the diameter of said flanges and defining with the cylindrical wall of said pocket an annular chamber which spans the plane of the abutting surfaces to permit the sleeve to tilt with respect to the fluid passages in said elements to compensate for relatively small misalignment between the aforesaid fluid passages, said inner faces of said flanges defining with said abutments and with the cylindrical walls of said pocket and the aforesaid end portions between said inner faces and said abutments a pair of substantially closed annular seal chambers which communicate with the aforesaid leakage paths, and annular seals disposed within said seal chambers around the aforesaid end portions of the sleeve to substantially fill said seal chambers and compressed into sealing engagement with all four of the surfaces defined by said seal chambers to close said leakage paths and thereby prevent leakage of fluid across said peripheral surfaces, said annular seals being made of compressible resilient material.

References Cited in the file of this patent

UNITED STATES PATENTS

| | | |
|---|---|---|
| 2,195,547 | Vickers | Apr. 2, 1940 |
| 2,652,895 | Arrwood | Sept. 22, 1953 |
| 2,737,402 | Frumerie et al. | Mar. 6, 1956 |
| 2,819,914 | Eitner | June 14, 1958 |
| 2,862,731 | Hedden | Dec. 2, 1958 |
| 2,900,199 | Logan | Aug. 18, 1959 |
| 2,914,347 | Magnani | Nov. 24, 1959 |

FOREIGN PATENTS

| | | |
|---|---|---|
| 849,453 | Germany | Jan. 22, 1953 |